(12) United States Patent
Emami

(10) Patent No.: US 8,987,641 B2
(45) Date of Patent: Mar. 24, 2015

(54) HIGH PERFORMANCE HEATER

(76) Inventor: Arsalan Emami, Aliso Viejo, CA (US)

( * ) Notice: Subject to any disclaimer, the term of this patent is extended or adjusted under 35 U.S.C. 154(b) by 317 days.

(21) Appl. No.: 13/517,850

(22) Filed: Jun. 14, 2012

(65) Prior Publication Data

US 2013/0161314 A1    Jun. 27, 2013

Related U.S. Application Data

(60) Provisional application No. 61/499,067, filed on Jun. 20, 2011.

(51) Int. Cl.
| | | |
|---|---|---|
| *H05B 3/06* | (2006.01) | |
| *H05B 3/08* | (2006.01) | |
| *H05B 3/66* | (2006.01) | |
| *F27B 5/08* | (2006.01) | |
| *F27B 5/14* | (2006.01) | |
| *F27D 1/04* | (2006.01) | |
| *F27D 11/02* | (2006.01) | |
| *B23P 19/00* | (2006.01) | |
| *F27D 1/00* | (2006.01) | |
| *F27B 17/00* | (2006.01) | |

(52) U.S. Cl.
CPC ............. *F27D 11/02* (2013.01); *B23P 19/00* (2013.01); *F27D 1/0036* (2013.01); *F27D 1/0006* (2013.01); *F27B 5/14* (2013.01); *F27B 17/0025* (2013.01); *H05B 3/08* (2013.01); *H05B 3/66* (2013.01)
USPC ........... 219/397; 219/402; 219/411; 219/537; 219/541; 373/130

(58) Field of Classification Search
CPC .............. H04B 3/66; H04B 3/06; F27B 5/14; F27B 17/0025; F27B 2005/14; F27D 1/0006; F27D 11/02; F27D 99/0006; H01L 21/67115
See application file for complete search history.

(56) References Cited

U.S. PATENT DOCUMENTS

| | | | | |
|---|---|---|---|---|
| 5,187,771 | A * | 2/1993 | Uchida | 392/416 |
| 5,763,856 | A * | 6/1998 | Ohkase | 219/390 |
| 5,896,410 | A * | 4/1999 | Nguyen et al. | 373/153 |
| 6,005,225 | A * | 12/1999 | Kowalski et al. | 219/390 |
| 6,807,220 | B1 * | 10/2004 | Peck | 373/128 |
| 7,888,622 | B2 * | 2/2011 | Nakao et al. | 219/385 |
| 7,974,525 | B2 * | 7/2011 | Kobayashi et al. | 392/416 |
| 8,023,806 | B2 * | 9/2011 | Ichikawa et al. | 392/416 |
| 8,476,560 | B2 * | 7/2013 | Kobayashi et al. | 219/390 |
| 2012/0061377 | A1 * | 3/2012 | Agamohamadi et al. | 219/468.1 |

FOREIGN PATENT DOCUMENTS

| | | | | | |
|---|---|---|---|---|---|
| GB | | 1248574 | A | * 10/1971 | |
| GB | | 2094960 | A | * 9/1982 | F27B 14/06 |

* cited by examiner

*Primary Examiner* — Joseph M Pelham

(57) ABSTRACT

Systems and methods are provided for a high performance heater. In an embodiment, the high performance heater comprises a first stackable tray comprising a first alignment pin that insulates a first heating element disposed in the first stackable tray; a second stackable tray comprising a second alignment pin that insulates a second heating element disposed in the second stackable tray, wherein a top of the first alignment pin fits into a cutout of a bottom of the second alignment pin when the first and second stackable trays are stacked, and wherein the first and second stackable trays comprise one or more materials, an outer diameter and an inner diameter, and wherein an area between the outer diameter and the inner diameter of the stackable trays comprises at least one cutout portion that allows expansion of the material(s) when the high performance heater is at high temperatures.

23 Claims, 10 Drawing Sheets

SECTION A-A

Figure 9

902 — determining one or more zones of the heater according to demand, wherein each zone comprises one or more heating elements therein 904 — sizing the heating element(s) in each zone according to the demand of each zone.

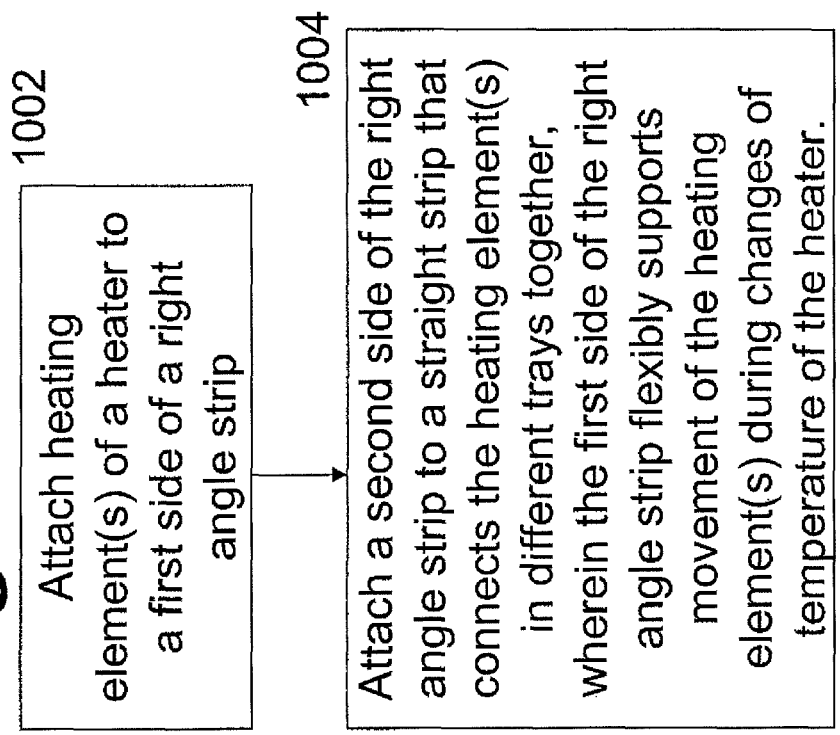

HIGH PERFORMANCE HEATER

RELATED APPLICATIONS

The present application claims priority to U.S. Provisional patent application Ser. No. 61/499,067, which was filed on Jun. 20, 2011, the contents of which are herein incorporated in their entirety.

BACKGROUND

1. Technical Field

Embodiments of the present disclosure generally relate to furnaces, and more particularly, to methods and systems for furnaces with high performance heaters.

2. Related Art

Furnace structures typically use heating elements such as resistance wires. Many applications using furnaces require the furnace structure and heating elements to be responsive to temperature changes and maintain a uniform temperature over some period of time. The furnace structure as well as heating elements typically go through many thermal cycles during their lives. Portions of the furnace structure may not expand at the same rate when the heater is at high temperatures. Such expansion may result in cracks and breakage of the furnace structure. Also, heating elements such as resistance wires may expand, grow, or elongate due to exposure to high temperatures over time. For example, when these wires are held firmly by ceramic separators at some fixed points for mechanical stability, they may expand or elongate beyond these points, leading to premature failure or breakage.

SUMMARY

As will be further described herein in relation to one or more embodiments, methods and systems are provided for furnaces with a high performance heater.

In accordance with an embodiment of the disclosure, a high performance heater comprises a first stackable tray comprising a first alignment pin that insulates a first heating element disposed in the first stackable tray; a second stackable tray comprising a second alignment pin that insulates a second heating element disposed in the second stackable tray, wherein a top of the first alignment pin fits into a cutout of a bottom of the second alignment pin when the first and second stackable trays are stacked, and wherein the first and second stackable trays comprise one or more materials, an outer diameter and an inner diameter, and wherein an area between the outer diameter and the inner diameter of the stackable trays comprises at least one cutout portion that allows expansion of the material(s) when the high performance heater is at high temperatures.

In accordance with another embodiment of the disclosure, a method for a high performance heater comprises forming stackable trays for holding heating elements therein, wherein each stackable tray comprises an alignment pin having a top portion and a bottom cutout portion; placing heating elements in the stackable trays; cutting each stackable tray into one or more cutout portions; and assembling the stackable trays to form the high performance heater using the alignment pin of each stackable tray such that the top portion of the stackable tray fits into the bottom cutout portion of another stackable tray.

These and other features and advantages of the embodiments of the present disclosure will be more readily apparent from the detailed description of the embodiments set forth below taken in conjunction with the accompanying drawings.

BRIEF DESCRIPTION OF THE FIGURES

FIG. 9 is a flowchart illustrating a method for sizing heating elements according to an embodiment of the present disclosure.

FIG. 10 is a flowchart illustrating a method for removing tension associated with elongation and contraction of a heater element according to an embodiment of the present disclosure.

Like element numbers in different figures represent the same or similar elements.

DETAILED DESCRIPTION

In accordance with one or more embodiments described herein, methods and systems are provided for a high performance heater. The high performance heater according to one or more embodiments may have a structure that uses one or more stackable trays to support or hold one or more heating elements. Advantageously, this heater structure may allow the heater to use different wire sizes for different zones of the heater based on demand for a specific zone. Also, the heater structure may allow thermocouples to be efficiently placed such that there is no movement of the thermocouple due to, for example, wire expansion. Furthermore, the heater structure may have a unique bussing scheme that enhances the life of the heater.

Figure 1:
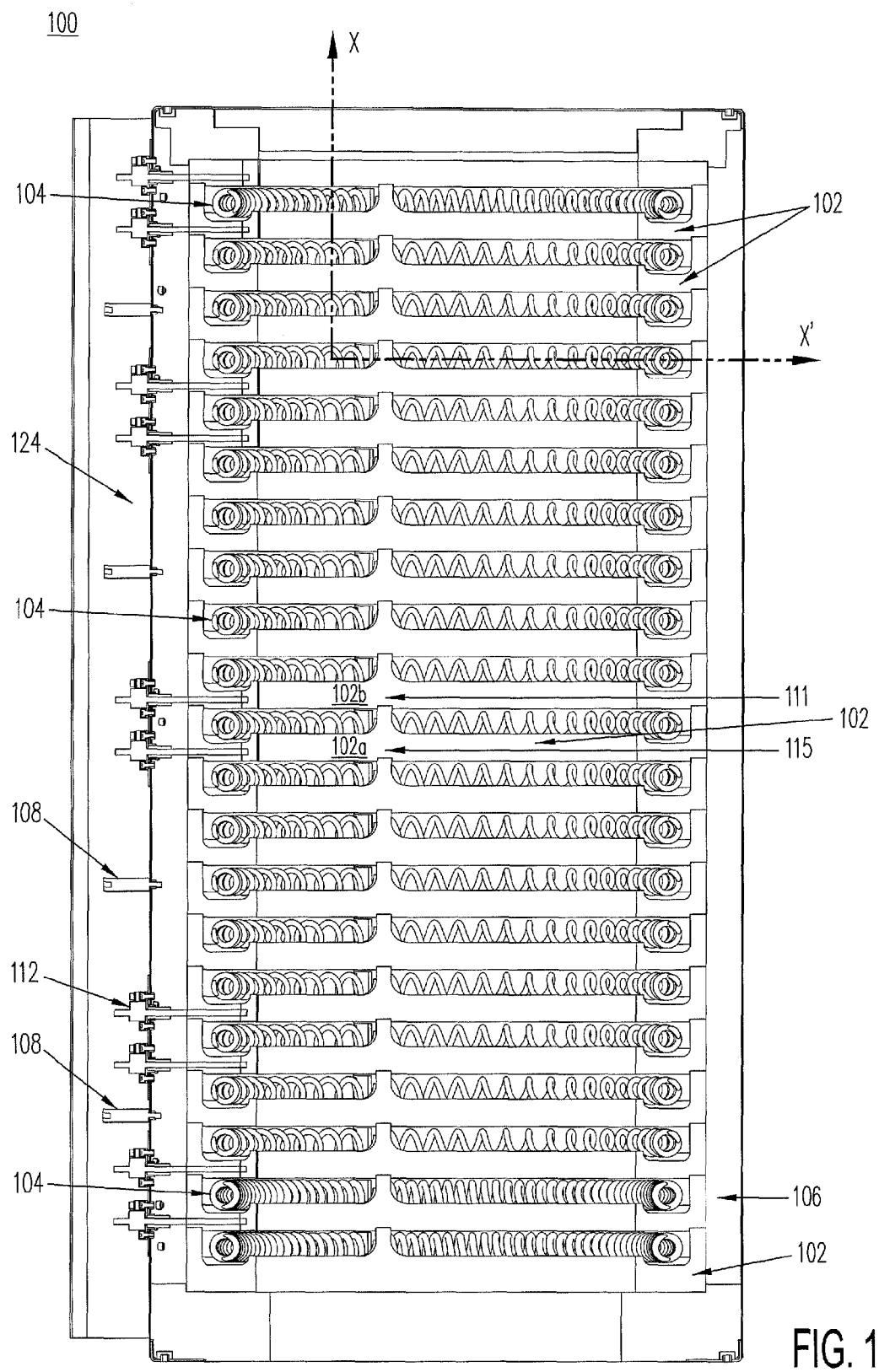
FIG. 1 illustrates a cross sectional view of a heater structure with stackable trays according to an embodiment of the present disclosure.

Referring now to the drawings wherein the showings are for purposes of illustrating embodiments of the present disclosure only, and not for purposes of limiting the same, FIG. 1 is a cross sectional view of a heater structure with stackable trays according to an embodiment of the present disclosure.

According to one or more embodiments, a high performance heater 100 may be a unibody structure having stackable trays 102 that stack together on each other to form the unibody structure of heater 100. In that regard, for example, at a fitting or connection section 111, a top edge of an alignment pin or divider 115 of a stackable tray 102a may fit into a cutout section at a bottom of another stackable tray 102b located above stackable tray 102a. As such, pin 115 may serve as an orientation guide so that stackable trays 102 line up when they are stacked.

Each stackable tray 102 may support or hold at least one heating element 104, providing room for expansion of the heating element as temperature rises. Heating elements 104 may be, for example, resistance wires or other appropriate heating elements. In an embodiment where resistance wires are used, a resistance wire may be any commonly used material such as Kanthal, Super-Kanthal, Molybdenum Disilicide, etc.

Alignment pin or divider 115 of a stackable tray 102 may be made of an insulating material and serve as a divider for a heating element 104 supported in the corresponding stackable tray 102. As such, pin 115 may divide heating element 104 therein so that the heating element ends or edges may not touch, thus avoiding an electrical short between the two ends or edges of the heating element.

The high performance heater 100 may be used in a furnace and produce heat in thermal design or control applications. A housing 106 encloses a heating area inside of heater 100. Housing 106 may be made of any appropriate material such as stainless steel and may generally be of any shape including circular, oval, elliptical, cylindrical, etc. Heater 100 may include a cover 124 that may cover one or more thermocouples 112, and may include one or more standoffs 108 (e.g. one or more screws or other appropriate hardware) attached to a surface of housing 106 to support the cover 124.

The high performance heater 100 may provide heat generation to an object (not shown) placed in the heating area inside heater 100 enclosed by housing 106. Such an object may be any suitable object, structure, element, or component that needs to be heated at a predefined temperature range. For example, an object may be a semiconductor wafer. The temperature range may be any suitable range as required, for example, from about 25° C. to 1700° C. For instance, the temperature range for semiconductor wafer applications may be between about 500° C. and 1200° C. In an embodiment, the high performance heater 100 may be used in a furnace and may be controlled by a computer system to a given temperature prior to processing of an object such as a semiconductor substrate.

The high performance heater 100 may be positioned in different manners, for example, horizontally or vertically. In the embodiment of FIG. 1, stackable trays 102 are aligned and stacked together on one another in a vertical direction. In this regard, consideration is taken to ensure that the stackable trays (and heating elements) at the bottom of heater 100 are designed to sustain the weight of all the stackable trays above them. The number of stackable trays (and heating elements) may vary according to the applications or the number of zones divided in the heating area of heater 100. In general, stackable trays 102 may have similar shape and construction style. Therefore, the construction and assembly of heater 100 are greatly simplified.

Figure 2:
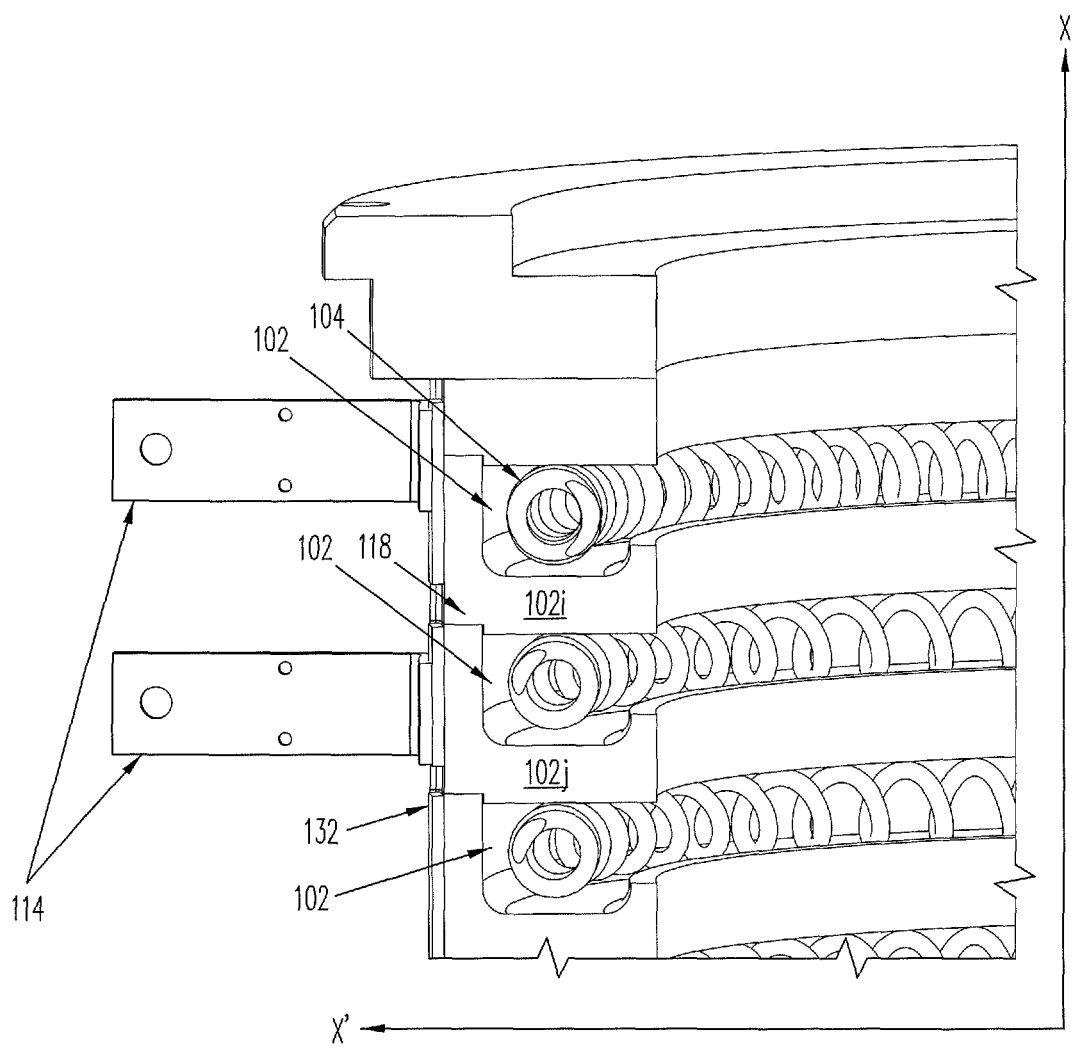
FIG. 2 illustrates a cross sectional view of a portion of the high performance heater of FIG. 1 along line X-X' according to an embodiment of the present disclosure.

Referring to FIG. 2, a cross sectional view of a portion of the high performance heater of FIG. 1 along line X-X' is illustrated according to an embodiment of the present disclosure. As illustrated in the embodiment of FIG. 2, stackable trays 102i and 102j are aligned and stacked on one another. In that regard, at a fitting or connection section 118, a top edge of stackable tray 102j fits into a left bottom cutout at an edge of stackable tray 102i.

Stackable trays 102 may have one or more straight strips 132 attached to or embedded on one side thereon. Power terminal leads 114 are attached to straight strips 132 as will be described in more detail below. Power terminal leads 114 and straight strips 132 may be made of any conductive material such as metal with sufficient size for mechanical and electrical stability.

Heating elements 104 may be connected in a zigzag pattern from the top stackable tray to the bottom stackable tray, forming an electrically continuous connection. Power terminal leads 114 may be provided at selected heating zones to provide proper electrical power for different amounts of heat to be generated as described herein.

Figure 3:
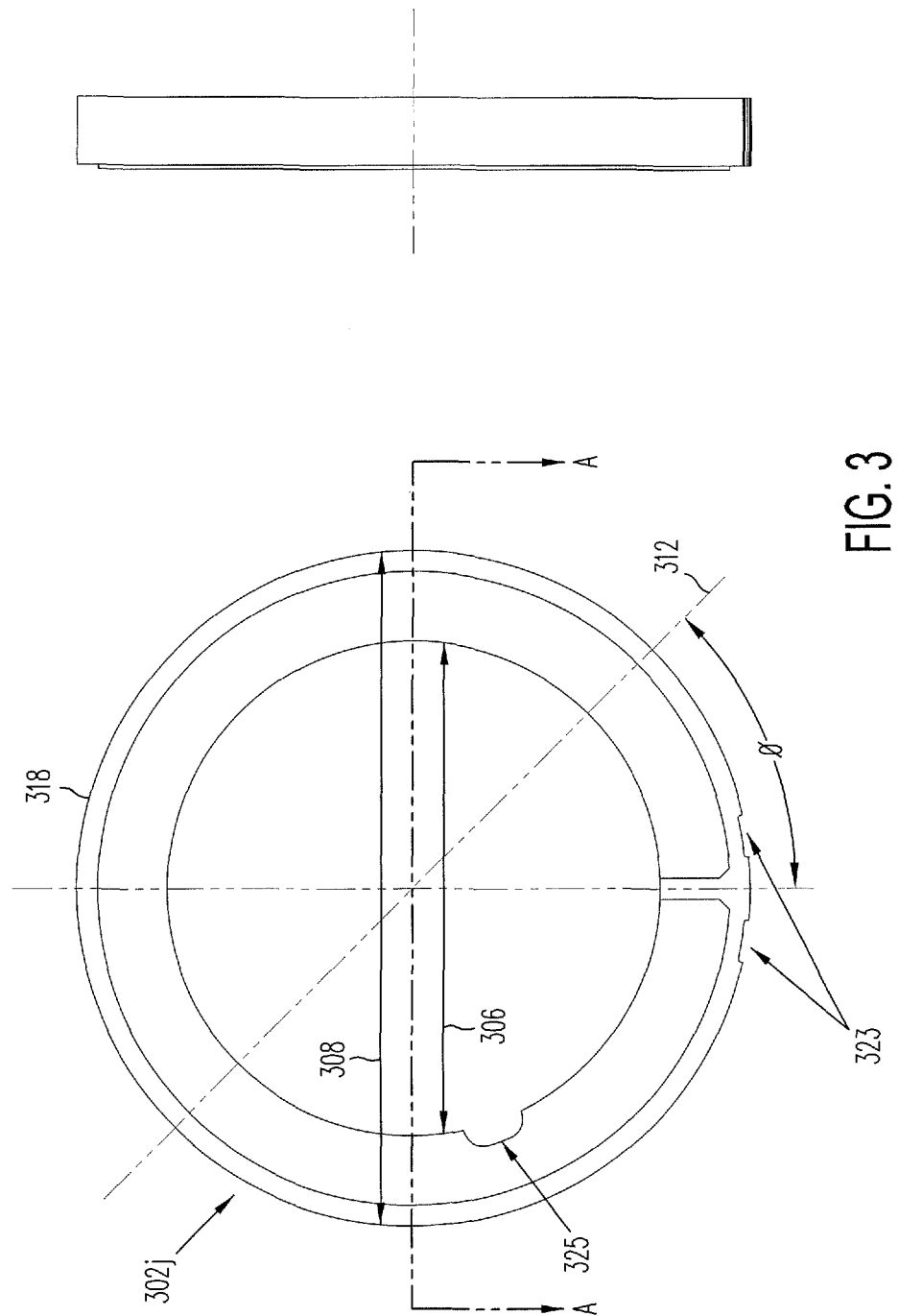
FIG. 3 illustrates a top view of a stackable tray according to an embodiment of the present disclosure.

Referring to FIG. 3, a top view of a stackable tray is illustrated according to an embodiment of the present disclosure. A stackable tray 302j may correspond to any one of stackable trays 102 illustrated in FIG. 1 according to one or more embodiments. Stackable trays 102 may be of any shape including circular, oval, elliptical, etc. such that the stackable trays 102 may fit inside housing 106 (shown in FIG. 1) of high performance heater 100.

Stackable tray 302j may include one or more pockets or recesses 323 adapted to fit one or more strips such as straight strips 132 illustrated in the embodiment of FIG. 2. As such, one or more straight strips may be embedded on a side of stackable tray 302j. This arrangement facilitates alignments and manufacturing and avoids taking space that may be used for insulation.

According to an embodiment, stackable tray 302j may include a cutout 325 that may be used for placing a thermocouple as will be described in more detail below with respect to the embodiment of FIG. 5.

Stackable tray 302j has an insulation wall 318, which provides insulation for the heating area of heater 100. Insulation wall 318 may be made of any material that is highly resistant to heat, has a low temperature expansion coefficient, has a low heat transfer coefficient, and maintains its properties over time. An example of such material is a mixture of aluminum oxide ($Al_2O_3$) and silicon dioxide or silica ($SiO_2$). As known by one skilled in the art, any other insulating materials having the above desirable characteristic may be used.

Stackable tray 302j may be cut into sections, for example, into two equal halves along line 312 at any appropriate angle Ø, where Ø may be any angle from about 1° to 360°. Stackable tray 302j has an inner diameter, or circumference 306 and an outer diameter, or circumference 308. Notably, outer diameter 308 and inner diameter 306 of stackable tray 302j may not expand at the same rate when heater 100 is at high temperatures due to insulation wall 318 causing different temperatures on either side of insulation wall 318. By cutting stackable tray 302j into one or more cutout portions, for example, into two equal halves along line 312, a tray material is allowed to expand without introducing cracks and breakage in the material. In an embodiment, stackable tray 302j may be cut into sections such as into two equal halves by minimal removal of material along line 312. In one or more embodiments, tray materials may include aluminum oxide ($Al_2O_3$) or silicon dioxide or silica ($SiO_2$), their equivalents, or any combination.

Figure 4:
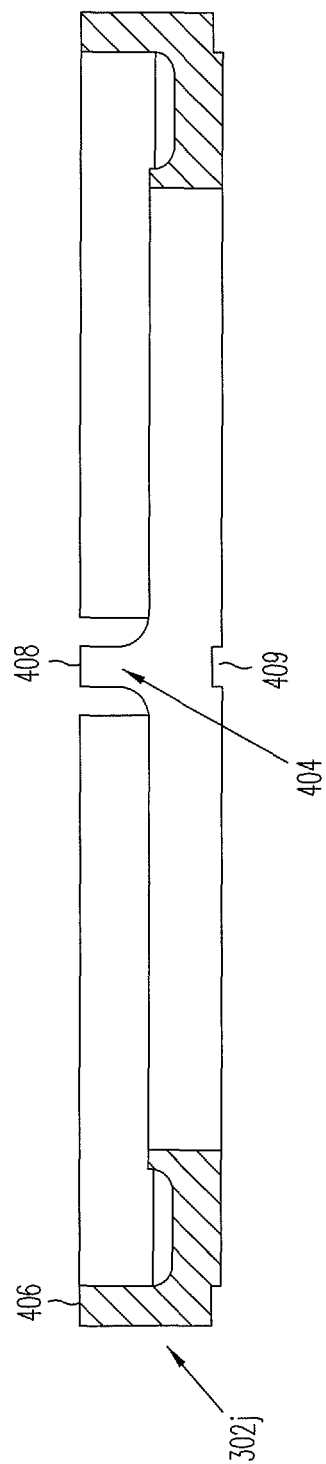
FIG. 4 illustrates a front view of the stackable tray of FIG. 3 along line A-A' according to an embodiment of the present disclosure.

Referring to FIG. 4, a front view of the stackable tray 302j of FIG. 3 along line A-A' is illustrated according to an embodiment of the present disclosure.

Stackable tray 302j includes a divider or alignment pin 404 having a top edge 408 such that the top edge 408 is adapted to fit or connect to another stackable tray as illustrated, for example, at connection section 111 in FIG. 1 according to an embodiment. Pin 404 may correspond to any one of pins 115 illustrated in the embodiment of FIG. 1. Similarly, a top edge 406 of stackable tray 302j is adapted to fit or connect to another stackable tray as illustrated, for example, at connection section 118 in FIG. 2 according to an embodiment. A cutout 409 at a bottom portion of stackable tray 302j is adapted to receive and fit a top edge of an alignment pin of another stackable tray. As such, stackable tray 302j may be stacked above or below another stackable tray.

As described above, alignment pin 404 may serve as an electrical divider of a heating element that may be disposed in stackable tray 302j, thus insulating the heating element therein. Pin 404 may be made of any electrically insulating material including, for example, a mixture of aluminum oxide ($Al_2O_3$) and silicon dioxide or silica ($SiO_2$), or any other insulating materials having desirable characteristics.

Stackable trays such as stackable fray 302j may be assembled together to form the unibody structure of high performance heater 100 as illustrated for example in the embodiment of FIG. 1. Pin 404 may be used as an orientation guide for stacking the stackable trays to form the structure of heater 100. In that regard, the orientation of the cutout line 312 (illustrated in the embodiment of FIG. 3) may change, for example, by 180 degrees from one stackable tray to another, which builds strength into the structure, allowing the stackable trays to uphold themselves once they are stacked up.

Figure 5:
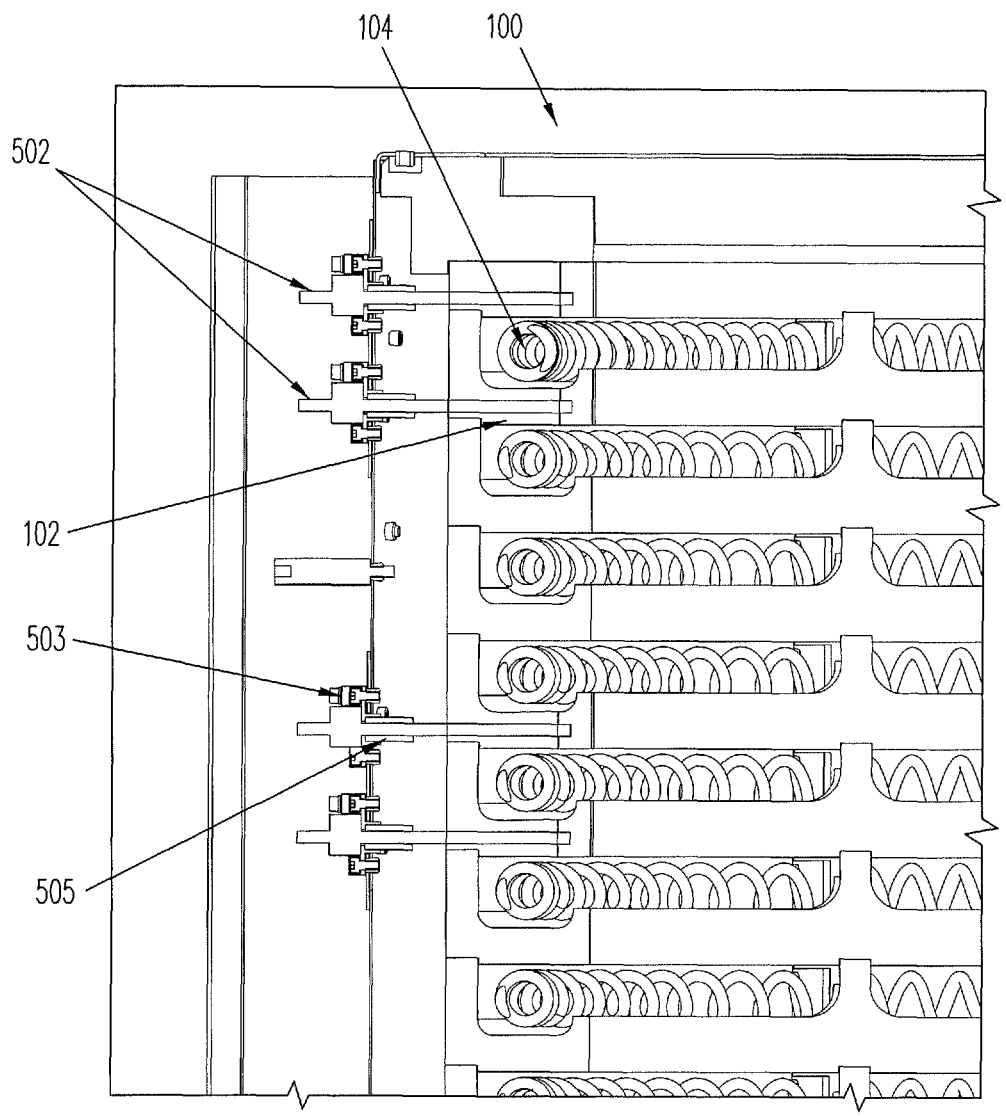
FIG. 5 illustrates a cross sectional view of a portion of a heater with thermocouples according to an embodiment of the present disclosure.

Referring to FIG. 5, a cross sectional view of a portion of a heater with thermocouples is illustrated according to an embodiment of the present disclosure.

According to one or more embodiments, at least one thermocouple 502 may be placed through a bottom section of a stackable tray 102, such that thermocouples 502 have no contact with a heating element 104 at all. Thermocouple 502 may be inserted or fitted into the bottom section of stackable tray 102, for example, via a hole or opening that may be drilled in the bottom section of the tray. A thermocouple holder 503 may be fastened to the housing (e.g., housing 106 in the embodiment of FIG. 1). Thermocouple holder 503 may provide for easy insertion and securing the location of thermocouple 502, without any heat leaking from the heater where the thermocouples are inserted. A thermocouple guide 505, for example, a ceramic tube, may be used to guide the thermocouple 502 into the hole or opening at the bottom portion of the stackable tray, which may correspond to cutout 325 illustrated in the embodiment of FIG. 3.

In a typical heater, a Spike thermocouple (Spike is a name typically used for a thermocouple that is placed near a heater coil, for the purpose of controlling the heater temperature) is placed in a tight space between the heater coil windings. A problem associated with this typical heater is that the wire expands and often moves from its original position. When that happens, it is very difficult to place the thermocouple in the location it was originally intended. As such, the thermocouple in the typical heater is usually obstructed by the wire and or by putting pressure on the wire, and it may deform the wire at that location, which may cause the wire to contact the adjacent coil and the heater to fail. In contrast, according to one or more embodiments, high performance heater 100 may allow at least one thermocouple 502 to be efficiently located such that there is no movement of the thermocouple due to, for example, wire expansion. This thermocouple placement contributes to high reliability of the heater and makes thermocouple placement a very effortless task.

Figure 6:
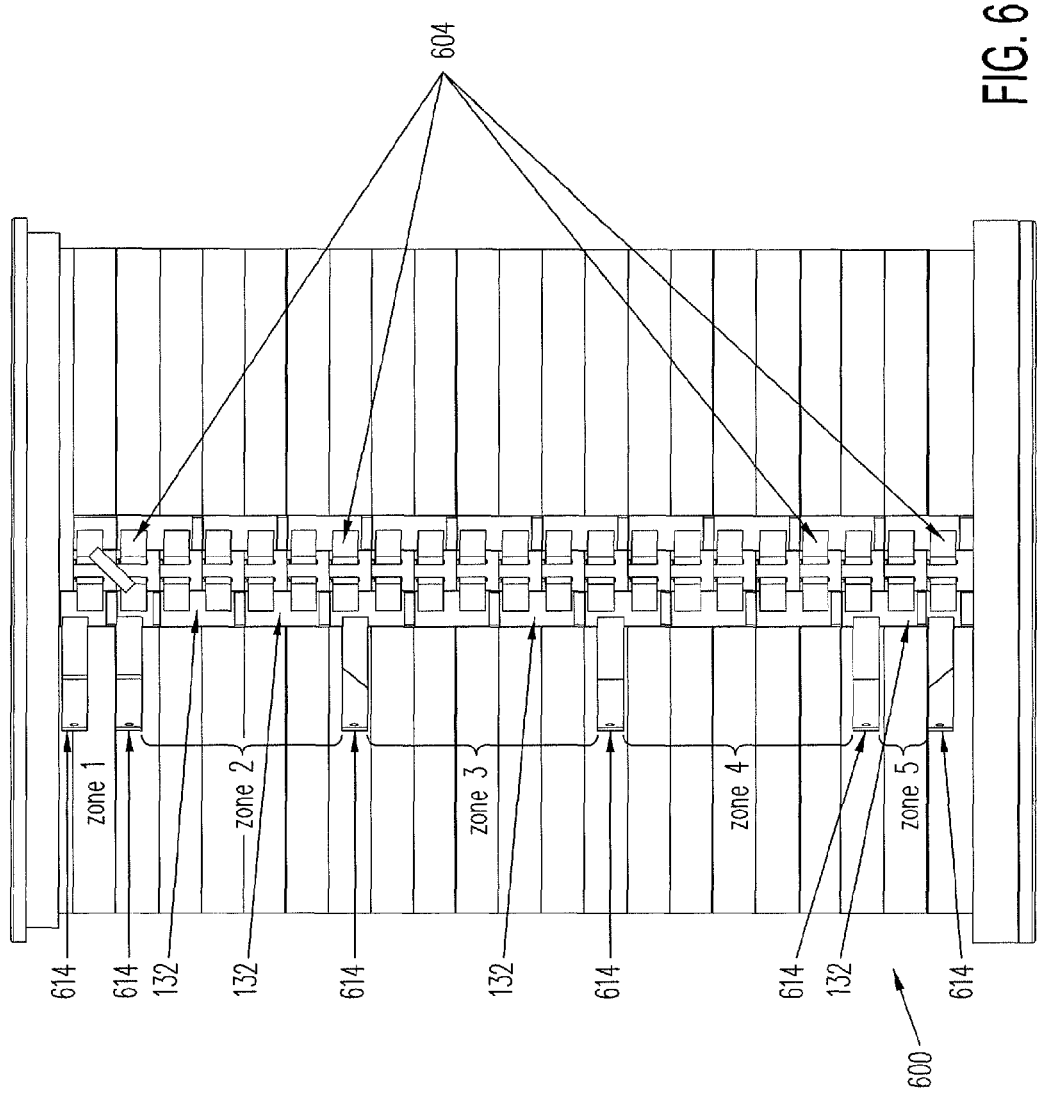
FIG. 6 illustrates a heater structure showing zones and a bussing scheme according to an embodiment of the present disclosure.

Referring now to FIG. 6, a cross sectional view of a heater structure showing zones and a bussing scheme is illustrated according to an embodiment of the present disclosure. FIG. 6 illustrates a high performance heater 600 showing a back side of the stackable trays that may correspond, for example, to the embodiment of FIG. 2.

The high performance heater 600 may have different heating zones at different temperature ranges according to applicable requirements or specifications. In an embodiment, one or more power terminals 614 may be allocated to correspond to one or more heating zones. As such, high performance heater 600 may be divided into five different zones 1-5, for example, a top zone 1, middle zones 2, 3 and 4, and a bottom zone 5. In particular, the top zone 1 may include one heating element such as heating element 102, the bottom zone may include 2 heating elements, and the middle zones 2, 3 and 4, may each include 6 heating elements for a total of 18 heating elements. For example, each middle zone may be about ten inches long, which may correspond to six stackable trays per each middle zone. In one or more embodiments, the number of middle zones, stackable trays per zone, etc., may vary according to specific requirements.

A power source may provide power to the heating area inside heater 600 to generate heat when power is applied. The power source (not shown) may be coupled to the one or more power terminals 614. The power source may include power controllers that control the amount of current and/or voltage to heater 600, for example, via solid state relays. By receiving different amounts of current and/or voltage via the individual power terminals 614, heater 600 is able to generate heat profiles in the corresponding heating zones.

This structure of high performance heater 600 may allow the use of different sizes for heating elements within a zone depending on demand for the specific zone. For example, in an embodiment where heating elements are coils, different wire sizes may be used for the coils in different zones of the heater based on demand for the specific zone. Typically, one wire size is used for the entire heater and all of the zones of a heater. In contrast, according to one or more embodiments, a heating element size (e.g., wire size) may be based on the demand for that specific zone. For example, in heater 600, which includes zones 1-5, zone 5 is the bottom zone of heater 600 and may use the highest thickness wire. Top zone 1 may be the zone with the second most demand, therefore, a wire of a thickness less than a wire used in the bottom zone 5 may be used. Middle zones 2, 3, and 4 may use wires of lesser thickness than wires used in bottom zone 5 and top zone 1. The use of different heating element sizes (e.g., wire sizes) allows optimization of each zone and improves heater performance and life while saving costs. Notably, cost savings are a result of for example, not using heavy wire everywhere throughout the heater, but instead, using thinner (and less expensive) wire sizes in the appropriate zones.

FIG. 6 also illustrates a heater structure showing a bussing scheme according to an embodiment of the present disclosure. High performance heater 600 according to one or more embodiments may have a structure with a unique bussing scheme that enhances the life of the heater. In general, strips, for example, straight strips 132 and/or right-angle strips 604 may be used to connect heating elements of heater 600 to one another as well as to connect incoming power for heater 600. The heating elements, for example resistance wire parts, may be connected to one another; in addition, incoming power may be connected to heater 600 in a unique manner that improves heater life and takes advantage of applicable material science, wire behavior, and attachment (e.g. welding) techniques resulting in zero failures and high reliability of the heater.

Figure 7:
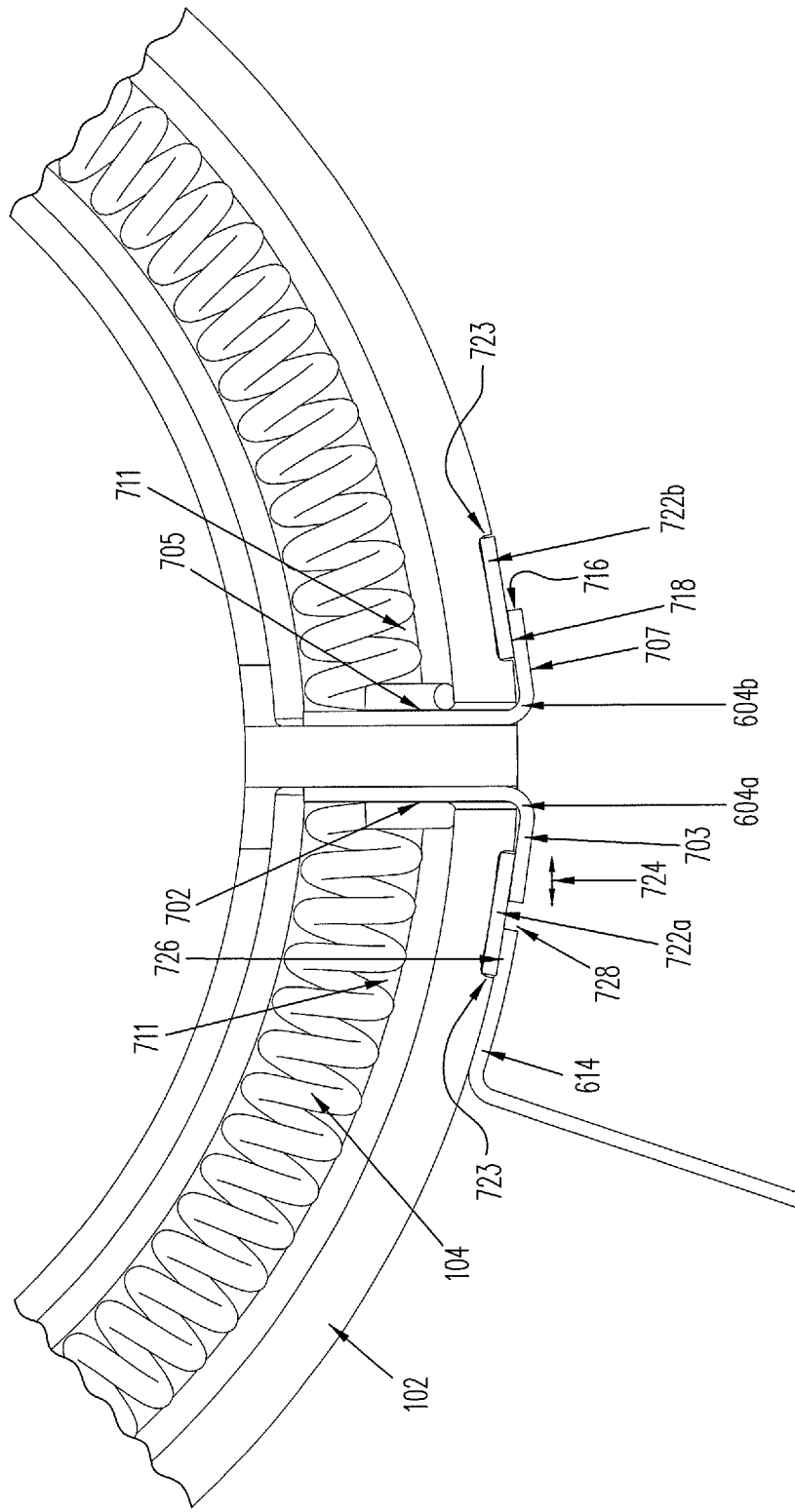
FIG. 7 illustrates a top view of a cutout portion of a tray using strips according to an embodiment of the present disclosure.

Referring to FIG. 7, a top view of a cutout portion of a tray using strips is illustrated according to an embodiment of the present disclosure.

In this embodiment, a first side of a heating element 104 is coupled, for example, welded, to a front side 702 of a right angle strip 604a, and a second side of heating element 104 is coupled to a front side 705 of a right angle strip 604b. Right-angle strips 604a and 604b also have a back side 703 and 707, respectively. The back sides 703 and 707 of right-angle strips 604a and 604b may be coupled (e.g., welded) to a respective straight strip 722a or 722b that connects all of the heater elements in different trays together as shown, for example, in the embodiment of FIG. 6 (straight strips 722a may also correspond to straight strips 132 illustrated in the embodiment of FIG. 2). Pockets or recesses 723 (which may correspond to recesses 323 illustrated in the embodiment of FIG. 3) may be cutout from a side of stackable tray 102 such that recesses 723 are adapted to receive or fit straight strips 722a and/or 722b that may be placed therein. In an embodiment, when straight strips 722a and/or 722b are placed in recesses 723, straight strips 722a and/or 722b may be flush with a side of stackable tray 102. As such, straight strip 722a and/or 722b may be embedded on a side of stackable tray 102. This arrangement facilitates alignments and manufacturing and avoids taking space that may be used for insulation.

Because front sides 702 and 705 of right-angle strips 604a and 604b, which are inside heating area 711, may be coupled to heater element 104, front sides 702 and 705 may each act as a spring that supports any expansion and contraction of heater element 104 during heating and cooling of the heater. Thus, this behavior of right-angle strips 604a and 604b removes any tension associated with elongation and contraction of the heater element, from the heater element itself, and improves heater element life.

According to one or more embodiments, a most reliable electrical weld is provided when at minimum two sides of a part are welded instead of just a single point of connection. As illustrated in the embodiment of FIG. 7, the back side 707 of right-angle strip 604b makes two weld connections, for example, at areas 716 and 718, with a straight strip 722b that connects the heating elements from one tray to another. Similarly, the back side 703 of right angle strip 604a makes two weld connections with a straight strip 722a. The dual weld connection, along with overlapping material at section 724 (shown only for right angle strip 604a) makes for a most reliable welding technique.

Terminal lead 614 (which may correspond to power terminal leads 114 illustrated in the embodiment of FIG. 2) also has a dual weld connection with straight strip 722a, at areas 726 and 728, connecting the outside power to heater 100.

It will be appreciated that heater element 104 may be coupled, attached or connected to right-angle strips 604a and 604b, and power terminal 614 may be coupled, attached or connected to straight strips 722a and 722b, respectively, in different manners including welding or fastening using any appropriate fastening means such as glue, screws, staples or other fasteners.

Furthermore, although right angle strips (e.g., 604a and 604b) and generally rectangular straight strips (e.g., 722a and 722b) are illustrated, it should be appreciated that any other appropriate shape of strip or hardware may be used according to one or more embodiments.

Figure 8:
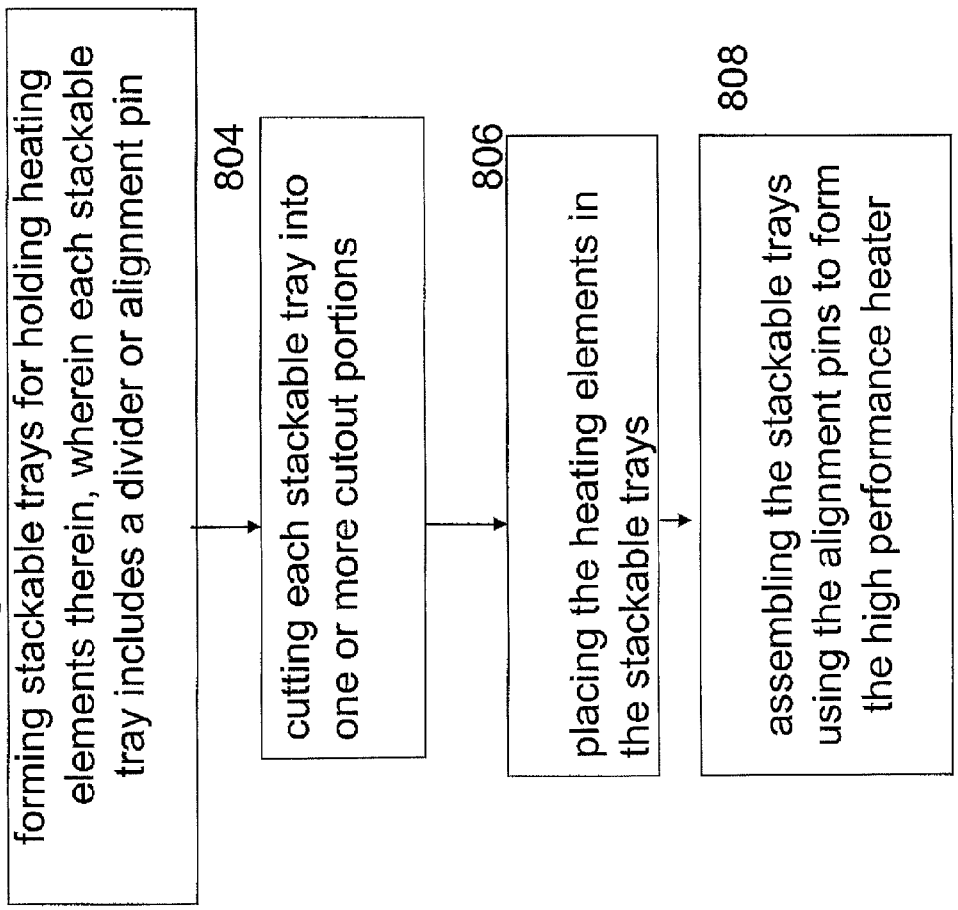
FIG. 8 is a flowchart illustrating a method for forming a high performance heater according to an embodiment of the present disclosure.

Referring now to FIG. 8, a flowchart illustrating a method for forming a high performance heater is illustrated according to an embodiment of the present disclosure.

In block 802, one or more stackable trays are formed for holding heating elements therein. Each stackable tray includes a divider or alignment pin that insulates the heating elements and serves as an orientation guide when the stackable trays are stacked.

In block 804, each stackable tray may be cut into one or more cutout portions. For example, a stackable tray may be cut approximately into halves.

In block 806, the heating elements may be placed into the stackable trays.

In block 808, the stackable trays may be assembled to form the high performance heater, for example, as illustrated in the embodiment of FIG. 1. When assembling the high performance heater, the alignment pins of each stackable tray may be aligned with respect to each other, and the orientation of the cutout portions may change, for example, by approximately 180 degrees from one stackable tray to another, which builds strength into the structure, allowing the stackable trays to uphold themselves once they are stacked up.

Insulation may be added after attaching (e.g., welding) one or more strips and one or more lead terminals. Then a housing (e.g., a stainless steel housing or shell) is placed over the insulation and secured. One or more lead terminal holders may then be put in place to protect the lead terminals from contacting the housing. One or more thermocouple holders may then be fastened to the housing. The thermocouple holders provide easy insertion and securing for the location of the thermocouples, without any heat leaking from the heater where the thermocouples are inserted. In one or more embodiments, a safety label and ID tag or any other appropriate labeling may be placed last.

Referring now to FIG. 9, a flowchart illustrating a method for sizing heating elements is illustrated according to an embodiment of the present disclosure.

In block 902, one or more zones of a heater are determined according to demand for each specific zone, wherein each zone comprises one or more heating elements therein.

In block 904, heating element(s) in each zone are sized according to the demand of each zone. Where typically one heating element size is used for the entire heater and all of the zones, according to one or more embodiments of the present disclosure, the heating element sizes have been optimized based on the demand of their corresponding specific zones. For example, in a heater having multiple zones, where a bottom zone has the highest demand, the heater element in that bottom zone would have the highest thickness. In a top zone, where the top zone has the next highest demand, the heater element(s) would have a size thinner than the heating element(s) in the bottom zone. And the middle zones (in an embodiment there may be 3 middle zones, for example), which may have the least demand, the heating elements would be sized thinner than the top and the bottom zones. This use of different heating element sizes for each zone provides for an improved heater life as well as cost savings.

Referring now to FIG. 10, a flowchart illustrating a method for removing tension associated with elongation and contraction of a heater element is presented according to an embodiment of the present disclosure.

In block 1002, a heating element disposed in a stackable tray of a heater, for example, a resistance wire, may be attached (e.g., welded) to a first side of a right angle strip. For example, a resistance wire may first be welded to a front side of a right-angle strip.

In block 1004, a second side of the right angle strip may be attached (e.g., welded) to a straight strip that connects together all the heating elements located in different trays. For example, the back side of the right-angle strip may be welded to the straight strip that connects all of the wires in different trays together. The first side of the right angle strip may flexibly support movement of the heating elements(s) during one or more temperature changes of the heater. As such, the first or front side of the right angle strip, which is inside a heating area, may act as a spring that supports the heating element (e.g. wire) expansion and contraction during heating and cooling of the heater. This behavior of the right angle strip thus removes any tension associated with elongation and contraction of the heating element, from the heating element itself, improving the life of the heating element.

Welding, in particular, electrical welding, is more reliable when, at minimum, two sides of a part are welded instead of just a single point of connection. In the embodiment described above, the back side of the right-angle strip makes two weld connections with the straight strips that connect the wire from one tray to another. The dual weld connection, along with overlapping material, makes for a most reliable welding technique.

In one or more embodiments, the terminal leads also have a dual weld connection with the straight strip connecting the outside power to the heater.

Where applicable, various embodiments provided by the present disclosure may be implemented using different types of hardware, materials, processes, or combinations thereof. Also where applicable, the various hardware components and/or materials or processes set forth herein may be combined into composite components comprising hardware, materials, processes and/or combinations thereof without departing from the spirit of the present disclosure. Where applicable, the various hardware components, materials and/or processes set forth herein may be separated into sub-components comprising hardware, materials, processes or a combination thereof without departing from the spirit of the present disclosure. In addition, where applicable, it is contemplated that hardware components or processes may be implemented as software components, and vice-versa.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Also, in the foregoing disclosure, numerous specific details are set forth. However, it is understood that embodiments of the disclosure may be practiced without these specific details. In other instances, well-known circuits, structures, and techniques have not been shown to avoid obscuring the understanding of this disclosure.

One or more embodiments of the disclosure may be described as a process that is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Having thus described embodiments of the disclosure, persons of ordinary skill in the art will recognize that changes may be made in form and detail without departing from the scope of the disclosure. Thus the disclosure is limited only by the claims.

What is claimed is:

1. A high performance heater comprising:
   a first stackable tray comprising a first alignment pin that insulates a first heating element disposed in the first stackable tray;
   a second stackable tray comprising a second alignment pin that insulates a second heating element disposed in the second stackable tray, wherein a top of the first alignment pin fits into a cutout of a bottom of the second alignment pin when the first and second stackable trays are stacked,
   wherein the first stackable tray and the second stackable tray comprise an annular shape, and
   wherein the first stackable tray and the second stackable tray comprises at least one material an outer diameter and an inner diameter, and wherein the outer diameter and the inner diameter of the first stackable tray and the second stackable tray comprise a diametrical cut across both trays.

2. The heater of claim 1, further comprising:
   wherein the first stackable tray and the second stackable tray are coupled together using the first alignment pin and the second alignment pin to form the heater such that an orientation of the diametrical cut is adjustable with respect to adjacent trays through an alignment of the first alignment pin with the second alignment pin.

3. The heater of claim 2, further comprising:
   wherein the orientation of the diametrical cut is 180 degrees with respect to an adjacent tray.

4. The heater of claim 1, further comprising:
   wherein the first stackable tray and the second stackable tray comprise diametrical cuts that cut the first stackable tray and the second stackable tray in half.

5. The heater of claim 1, further comprising:
   wherein the heater further comprises at least one zone,
   wherein the heating element located within the at least one zone is sized based on demand of its corresponding zone.

6. The heater of claim 5, further comprising:
   a bottom zone;
   a middle zone;
   a top zone,
      wherein the bottom zone comprises a heating element of a predetermined thickness,
      wherein the middle zone comprises another heating element of a thinner thickness than the bottom zone, and
      wherein the top zone comprises yet another heating element of an intermediate thickness in relation to the bottom zone and the middle zone.

7. The heater of claim 1, further comprising:
   at least one thermo couple located through a bottom section of the stackable tray, wherein the thermo couple does not contact the a heating element.

8. The heater of claim 1, further comprising:
   wherein the first heating element and the second heating element are connected to one another via a strip.

9. The heater of claim 8, further comprising:
   wherein the strip comprises a front side and a back side,
   wherein the front side is coupled to a heating element,
   wherein the back side is coupled to a straight strip,
   wherein the front side and the back side is configured into a right-angle.

10. The heater of claim 9, further comprising:
    wherein the front side supports expansion and contraction of the heating element during heating and cooling of the heater.

11. The heater of claim 10, further comprising:
    Wherein the front side and the back side are coupled to the straight strip and the heating element, respectively, via at least one of a welding means and a fastening means.

12. The heater of claim 1, further comprising:
    wherein at least one power terminal is coupled to the heater via a strip.

13. The heater of claim 12, further comprising:
    wherein the strip comprises a straight strip embedded on a side of at least one stackable tray.

14. A method for a high performance heater comprising:
forming stackable trays for holding heating elements there in, wherein each stackable tray comprises an alignment pin having a top portion and a bottom cut out portion;
placing heating elements in the stackable trays;
cutting each stackable tray in to at least one diametrical cut; and
assembling the stackable trays to form the high performance heater using the alignment pin of each stackable tray such that the top portion of the stackable tray fits into the bottom cutout portion of another stackable tray.

15. The method of claim 14, further comprising:
wherein the stackable trays comprise an annular shape,
wherein the assembling comprises adjusting the orientation of the at least one diametrical cut with respect to an adjacent tray when the stackable trays are stacked together to form the high performance heater.

16. The method of claim 14, further comprising:
Wherein the at least one diametrical cut comprises cutting each stackable tray approximately in half.

17. The method of claim 14, further comprising:
determining one or more zones of the heater according to demand,
wherein each zone comprises one or more heating elements therein; and
sizing the one or more heating element in each zone according to the demand of each zone.

18. The method of claim 17, further comprising:
determining that the heater comprises a bottom zone comprising a high demand, a top zone comprising an intermediate demand, and at least one middle zone comprising a low demand;
sizing the heating element,
wherein the bottom zone comprises a heating element of a predetermined thickness,
wherein the at least one middle zone comprises another heating element of a thinner thickness than the bottom zone, and
wherein the top zone comprises yet another heating element of an intermediate thickness in relation to the bottom zone and the top zone.

19. The method of claim 14, further comprising:
placing at least one thermo couple through a bottom section of the stackable tray,
wherein the at least one thermo couple does not contact the heating element.

20. The method of claim 14, further comprising:
attaching at least one heating element of a heater to a first side of a first strip;
attaching a second side of the strip to a second strip that connects to another heating element located in a different tray, and
wherein the first side of the first strip flexibly supports movement of the at least one heating element during one or more temperature changes of the heater.

21. The heater of claim 20, further comprising:
where in the first side and the second side of the first strip is configured into a right-angle.

22. The method of claim 14, further comprising:
welding at least one terminal lead to a straight strip.

23. The method of claim 20, further comprising:
wherein the attaching comprises at least one of a welding means and a fastening means.

* * * * *